(12) United States Patent
Fischer et al.

(10) Patent No.: US 8,273,314 B2
(45) Date of Patent: Sep. 25, 2012

(54) INTERNAL COMBUSTION EXCHANGER-REACTOR FOR FIXED BED ENDOTHERMIC REACTION

(75) Inventors: Beatrice Fischer, Lyons (FR); Stephane Bertholin, Ste Foy les Lyon (FR); Fabrice Giroudiere, Orlienas (FR); Jerome Colin, Lyons (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 710 days.

(21) Appl. No.: 12/293,126

(22) PCT Filed: Mar. 16, 2007

(86) PCT No.: PCT/FR2007/000466
§ 371 (c)(1),
(2), (4) Date: Jun. 29, 2009

(87) PCT Pub. No.: WO2007/118950
PCT Pub. Date: Oct. 25, 2007

(65) Prior Publication Data
US 2009/0274593 A1    Nov. 5, 2009

(30) Foreign Application Priority Data

Mar. 17, 2006  (FR) ...................................... 06 02432
Nov. 14, 2006  (FR) ...................................... 06 09923

(51) Int. Cl.
*B01J 8/00*    (2006.01)
(52) U.S. Cl. ........ 422/650; 422/187; 422/625; 422/629; 422/635; 422/641; 422/642; 422/643; 422/644; 422/646; 422/649; 422/651; 422/652; 422/655; 48/61; 48/75; 48/63; 48/93; 48/94; 48/127.9; 48/127.1

(58) Field of Classification Search .................. 422/187, 422/625, 629, 635, 641–644, 649–652, 655; 48/61, 127.9, 127.1, 197 R, 75, 93, 63
See application file for complete search history.

(56) References Cited

U.S. PATENT DOCUMENTS 2,163,599 A * 6/1939 Houdry .......................... 422/200
(Continued)

FOREIGN PATENT DOCUMENTS
EP       1 505 036 A2     2/2005
(Continued)

*Primary Examiner* — Kaity V. Handal
(74) *Attorney, Agent, or Firm* — Millen, White, Zelano & Branigan, P.C.

(57) ABSTRACT

The invention concerns an exchanger-reactor (1) comprising:
a vessel (2);
means for distributing a feed through a fixed bed catalytic zone (10);
means (6) for collecting effluent from the catalytic zone (10);
means for heating the catalytic zone (10);
in which said collection means (6) comprise conduits passing right through the catalytic zone (10), said conduits being distributed in the catalytic zone and interposed between the heating means, and in which the heating means of the catalytic zone are contained in sheaths (8) which are partially immersed in the catalytic zone (10), the sheaths (8) being open at one of their ends and closed at the other, the open end being fixed to an upper tube plate (21) defining the collection chamber (19) which is located above the catalytic zone (10), said heating means comprising at least one combustion zone (13) located close to the catalytic zone, means for supplying said combustion zone (13) with an oxidizing gas mixture (15) and with a gaseous fuel (17), and means for evacuating the gaseous effluent deriving from the combustion (14).

23 Claims, 6 Drawing Sheets

U.S. PATENT DOCUMENTS

| | | | |
|---|---|---|---|
| 2,167,698 A * | 8/1939 | Vose | 208/146 |
| 2,635,071 A * | 4/1953 | Atwood et al. | 208/152 |
| 3,909,299 A | 9/1975 | Corrigan | |
| 4,504,447 A | 3/1985 | Spurrier et al. | |
| 4,932,981 A * | 6/1990 | Ohsaki et al. | 48/94 |
| 6,264,856 B1 * | 7/2001 | Autenrieth et al. | 252/373 |
| 7,481,856 B2 * | 1/2009 | Docter et al. | 48/61 |
| 7,758,662 B2 * | 7/2010 | Son et al. | 48/61 |
| 2005/0026011 A1 | 2/2005 | Suzuki et al. | |

FOREIGN PATENT DOCUMENTS

| | | |
|---|---|---|
| EP | 1 516 663 A2 | 3/2005 |
| GB | 1 039 756 | 8/1966 |
| JP | 58-124532 A | 7/1983 |
| JP | 59-016536 A | 1/1984 |

* cited by examiner

INTERNAL COMBUSTION EXCHANGER-REACTOR FOR FIXED BED ENDOTHERMIC REACTION

The present invention relates to the field of reactors intended to carry out steam reforming reactions starting from hydrocarbon feeds with a view to producing a mixture of hydrogen and carbon monoxide termed synthesis gas.

More precisely, the present invention pertains to the technology of reactors which employ optimized means for controlling heat exchange for endothermic reactions, and more particularly for steam reforming reactions.

Steam reforming is the major process for producing hydrogen or synthesis gas constituted by hydrogen and carbon monoxide starting from a hydrocarbon feed and steam.

The hydrocarbon feed is composed of light hydrocarbons such as natural gas, refinery gases, LPG and light naphthas, more particularly methane, mixed with steam. In the case of methane, the following steam reforming reaction occurs:

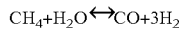

The steam reforming reaction is a highly endothermic chemical reaction ($\Delta H^{O}_{298}$=206 kJ/mol) which thus requires a great deal of external heat to be supplied.

PRIOR ART

Reactors which are used to carry out endothermic catalytic reactions for the production of hydrogen from a hydrocarbon feed are well known in the prior art.

U.S. Pat. No. 4,692,306 describes a steam reforming exchanger-reactor with a heating means located at the centre of an annular catalytic zone of reduced dimensions. It is clear that such a reactor is intended for small sized units. That exchanger-reactor technology is thus excluded for large capacity industrial applications.

U.S. Pat. No. 5,565,009 describes a fixed bed steam reforming exchanger-reactor heated by double tubes buried in the bed in which combustion is carried out. The feed penetrates from the outer extremity of the reactor into the catalytic bed where the steam reforming reaction takes place by dint of the heat of combustion transferred to the reaction medium by radiation.

This reactor does not allow heat exchanges between the various fluids to be optimized, as is allowed in the present invention.

U.S. Pat. No. 3,909,299 describes a reactor in which a steam reforming reaction is carried out, the reaction being permitted by a supply of heat provided by a burner supplied with a fuel and hydrogen and provided with jets allowing the passage of a stream of hot air generated in a combustion chamber which surrounds the compartments of the reactor containing the catalytic bed. The reactor in U.S. Pat. No. 3,909,299 can generate heat in the combustion chamber and distribute it around the compartments of the reactor containing the catalytic bed. This configuration does not allow a uniform distribution of heat within the catalytic zones.

EP-A-1 505 036 describes a reactor in which hydrogen is produced. The reactor contains a single burner immersed in a cylindrical catalytic zone, the combustion gases being evacuated into the annular space 4A-4B. After reaction in the cylindrical catalytic zone heated by the burner, the gaseous effluent from the reaction is collected and evacuated into an annular space external to the catalytic zone.

EP-A-1 516 663 describes a reactor in which the feed is vaporized by the heat released by combustion of fuel and air penetrating into the vessel of the reactor, the combustion zone being external to the catalytic bed. The combustion gases are also used to heat the catalytic bed.

U.S. Pat. No. 4,504,447 describes a reforming reactor provided with a burner which is external to the catalytic zone located inside a bayonet type tube, the burner being placed such that the combustion gases move in a conduit surrounding the catalytic zone. That configuration does not allow a uniform distribution of heat within the catalytic zone.

An aim of the invention is to overcome the disadvantages of the prior art and to provide a novel reactor technology, and more particularly a reactor having a particular internal structure in which the heat necessary for the endothermic reactor is supplied, inside the reactor, by a radiative and/or convective heat exchange series.

In the context of the highly endothermic steam reforming reaction, it is necessary to transfer the heat energy required for that reaction to the feed (a hydrocarbon and steam) and to the reaction zone containing the catalytic zone.

Thus, substantial heat exchange surfaces must be provided which are in contact with the catalyst: the usual solution described in the prior art consists of dividing the catalytic zone into a narrow space characterized by a low catalytic volume and a high heat exchange surface. Typically, the catalyst is disposed in a tubular configuration (single tube or double concentric tube (termed a bayonet tube)) or between closely spaced plates, the characteristic spacing of a catalytic zone being on a scale of ten centimetres.

In such configurations, the conversion capacity possible in such a space is limited. It would be folly to attempt to produce reactors by changing the scale of the units. Thus, the capacity of such apparatus can only be increased by multiplying the number of identical but separate catalytic zones which are assembled into a single vessel. It will be noted in this case that these reactors are usually assemblies of elementary reactors heated from the outside.

In contrast, our investigations have uncovered an alternative to the various devices which can maintain a single continuous catalytic zone, i.e. a zone which can be charged and discharged all at once.

The exchanger-reactor of the invention has a single continuous catalytic zone in which heat is generated and distributed in the catalytic zone, which is preferably the only zone, by heating means and means for collecting effluent which are different and distributed in said catalytic zone.

Description of Implementations

The invention concerns an exchanger-reactor 1 comprising:

a vessel 2;

means for distributing a feed through a fixed bed catalytic zone 10;

means 6 for collecting effluent from the catalytic zone 10;

means for heating the catalytic zone 10;

in which said collection means 6 comprise conduits passing right through the catalytic zone 10, said conduits being distributed in the catalytic zone and interposed between the heating means, and in which the heating means of the catalytic zone are contained in sheaths 8 which are partially immersed in the catalytic zone 10, the sheaths 8 being open at one of their ends and closed at the other, the open end being fixed to an upper tube plate 21 defining the collection chamber 19 which is located above the catalytic zone 10, said heating means comprising at least one combustion zone 13 located close to the catalytic zone, means for supplying said combustion zone 13 with an oxidizing gas mixture 15 and with a gaseous fuel 17, and means for evacuating the gaseous effluent deriving from the combustion 14.

At least two collection means 6 may be distributed in a single unique fixed bed catalytic zone and interposed between at least two heating means.

The means for distributing the feed may comprise a perforated lower tube plate the perforations of which are extended by tubular elements termed feed tubes.

The means for distributing feed through the fixed bed catalytic zone 10 may be constituted by truncated horizontal perforated plates and a non-truncated upper perforated plate, the perforations allowing passage of the effluent collection means 6.

The truncated horizontal perforated plates and the non-truncated upper perforated plate may be disposed in the inert lower zone 10c to form a system of baffles.

The perforated lower tube plate may be supported by a bed of inert beads.

The catalytic zone may comprise at least one lower inert zone located on said lower tube plate.

The lower inert zone may have a thickness which substantially corresponds to the length of said feed tubes.

The conduits for collecting effluent from the catalytic zone may be located between a collection chamber located downstream of the catalytic zone and the means for evacuating said effluent.

The conduits collecting effluent from the catalytic zone may traverse said lower tube plate in the internal space of the feed tubes.

The conduits collecting effluent from the catalytic zone may comprise ribs on their outer wall to increase the surface area in contact with the catalytic zone.

The sheaths may comprise ribs on their outer wall to increase the surface area in contact with the catalytic zone.

The heating means may be constituted by the following co-axial parts:
- a tube for supplying oxidizing gas mixture, opening into the sheath substantially at the upper level of the catalytic zone;
- a means for distributing fuel, termed a fuel tube, connected at one of its ends to the means for supplying fuel and located inside the tube for supplying oxidizing gas mixture and opening substantially at the same level.

The combustion zone may be located in the sheath 8 at the upper end of the catalytic zone 10.

In this case, the heating means may comprise a tube for re-circulating gaseous effluent from the combustion, open at both of its ends, and located in the sheath downstream of the combustion zone.

The heating means may also be constituted by the following co-axial parts:
- a tube for supplying an oxidizing gas mixture opening into the sheath substantially at the bottom of said sheaths;
- a means for distributing fuel, termed a fuel tube, connected at one of its ends to the means for supplying fuel, located inside the tube for supplying oxidizing gas mixture and extending substantially to the bottom of the sheaths, said fuel tube comprising at least one porous wall portion.

The perforations produced in the wall of the fuel tubes 112 may define a plurality of combustion zones 113 distributed along the wall of the fuel tubes 112 immersed in the catalytic zone 110.

The tubes for supplying oxidizing gas mixture may be filled with an oxidation catalyst to their full height and up to the upper end of the catalytic zone.

The heating means may also be constituted by:
- a tube for supplying oxidizing gas mixture opening into the sheath substantially at the bottom of said sheaths;
- an oxidation catalyst inside and over at least a portion of the height of the tubes for supplying oxidizing gas mixture at right angles to the catalytic zone and disposed downstream of the fuel distribution tube.

A cooling fluid may be injected into the chamber for collecting effluent from the catalytic zone.

The upper perforated tube plate may be constituted by a double wall to allow a cooling fluid to move in the internal space.

The combustion zone 13 may be located inside the catalytic zone 10.

The exchanger-reactor may be used for the steam reforming reaction.

DESCRIPTION OF FIGURES

Figure 1:
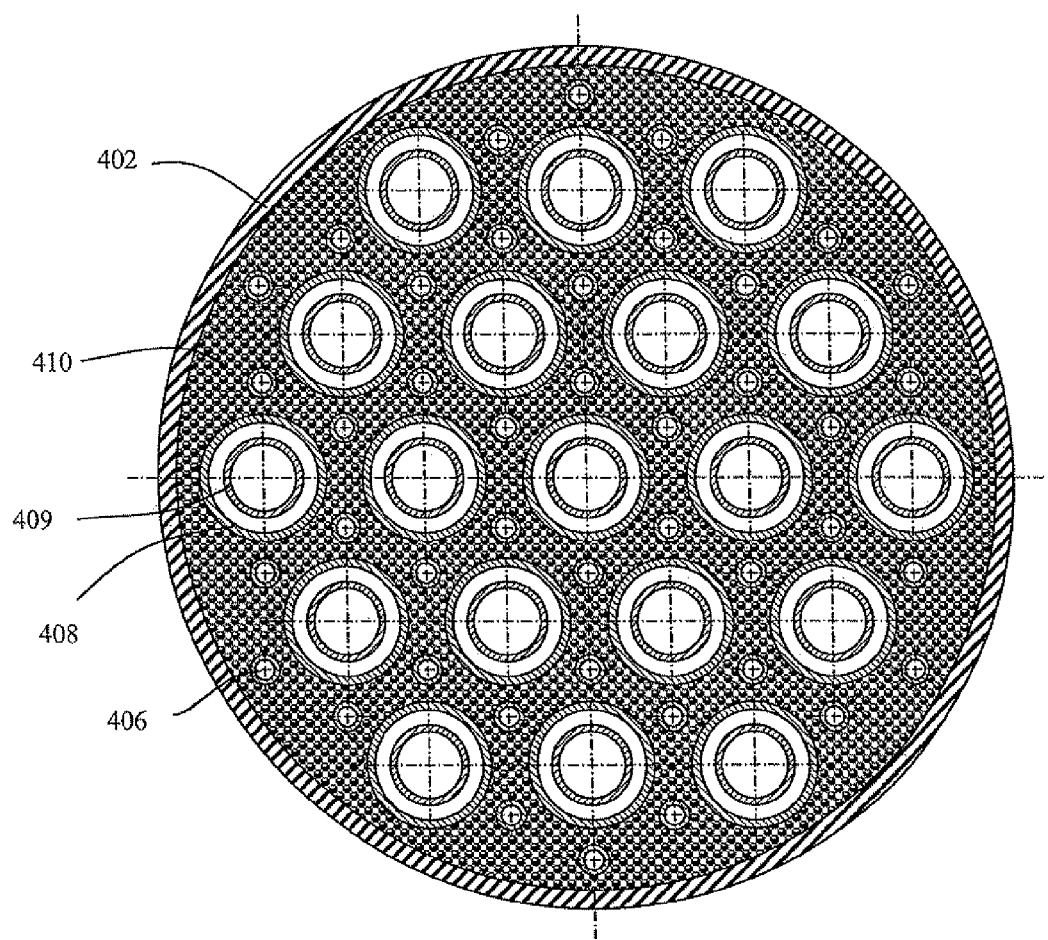
FIG. 1 shows a cross section along an axis BB' of the exchanger-reactor illustrated in FIG. 1.
Figure 2:
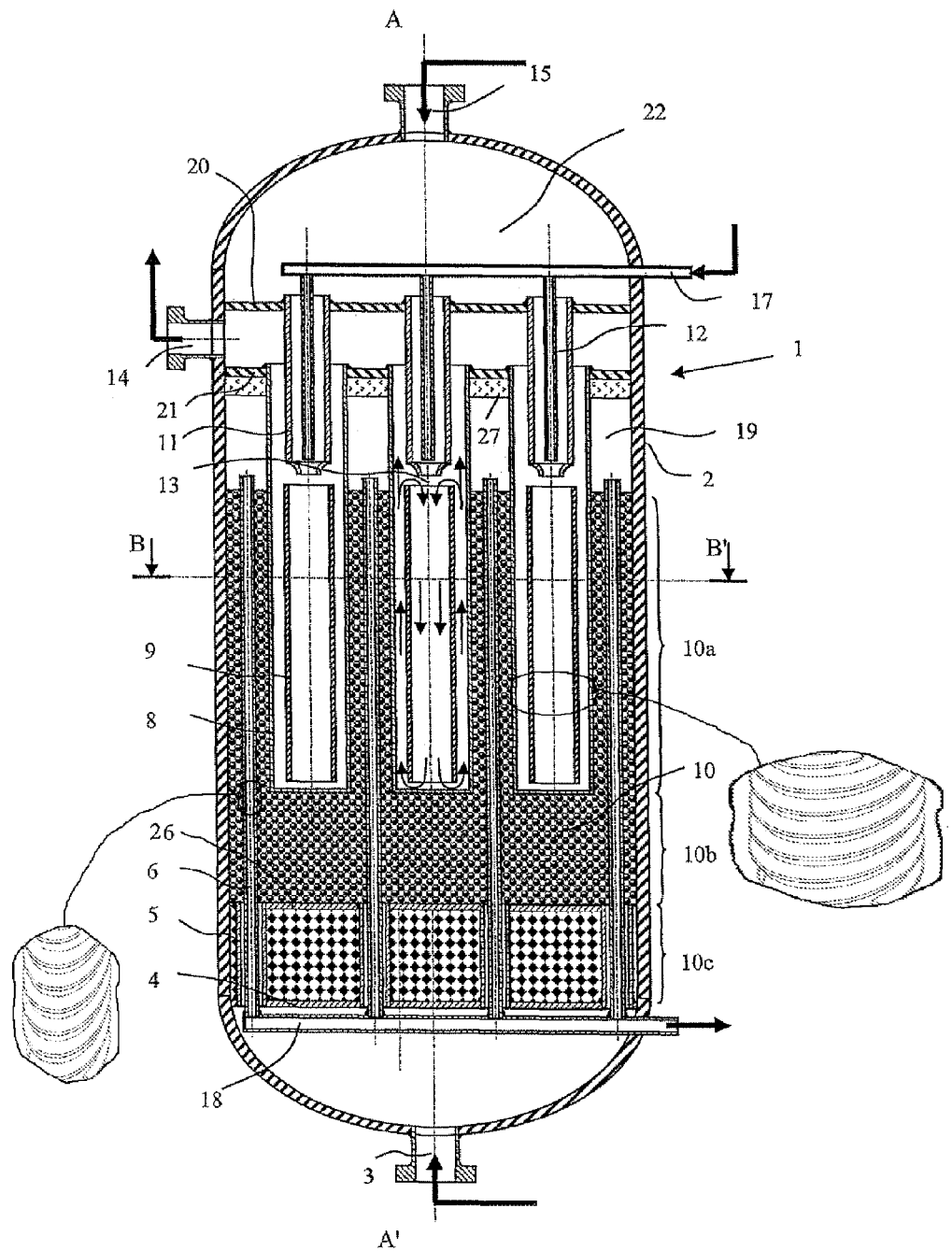
FIG. 2 shows a longitudinal sectional view along the axis AA' of the exchanger-reactor of the invention in its basic version.

FIG. 1 shows a sectional view of the reactor of the invention illustrated in FIG. 2 along an axis BB'. The means 406 for collecting the synthesis gas produced are distributed in the catalytic zone 410 and are interposed between the heating means such that heat exchanges between the feed and the synthesis gas produced are homogeneous. This configuration of the reactor of the invention thus allows a uniform distribution of heat in the catalytic zone. The sheaths 408 contain tubes 409 for re-circulating the gaseous effluent derived from combustion.

The exchanger-reactor 1 is shown diagrammatically in FIG. 2. It comprises a cylindrical vessel 2 having an axis AA' the inner surface of which is completely covered with an insulating refractory material (not shown in the Figure).

In its vessel 2, the exchanger-reactor 1 comprises a catalytic zone 10 lying in the lower portion of the exchanger-reactor on a perforated lower tube plate 4 fixed and sealed to the vessel of the reactor.

This catalytic zone 10 is divided into three layers disposed one above the other:
- an upper catalytic zone 10a;
- a median catalytic zone 10b;
- a lower inert zone 10c.

This vessel comprises:
- a means 3 for supplying hydrocarbon feed;
- a perforated lower tube plate 4 allowing passage of the hydrocarbon feed through the catalytic zone in tubular elements located in the extension of the perforations and connected to the surface of said plate. The tubular elements, termed feed tubes 5, have a length which is substantially equal to the thickness of the lower inert zone.

The perforated lower tube plate 4 and the tubular elements constitute the means for distributing feed through the catalytic zone;

a chamber 19 for collecting effluent from the catalytic zone located above the catalytic zone, said collection chamber 19 being blocked by an upper tube plate 21 fixed and sealed to the vessel of the reactor;

means 6 for collecting effluent from the catalytic zone passing right through the catalytic zone 10, said collection means 6 being constituted by conduits which place the collection chamber 19 in communication with a means 18 for evacuating effluent from the catalytic zone;

the upper tube plate 21 blocking the chamber 19 for collecting effluent derived from the catalytic zone has orifices in which sheaths 8 are fixed and sealed, said sheaths 8 being immersed in the catalytic zone 10 and more particularly in the upper active catalytic zone 10a. The sheath 8 is open at one of its ends and closed at the other, the open end being fixed to the tube plate 21 and opening into the space located between the tube plate 21 and the tube plate 20, and the closed end being immersed in the active catalytic zone. The space located between the tube plate 21 and the tube plate 20 allows gaseous effluent derived from combustion to be collected and allows evacuating said effluent using the evacuation means 14;

inside said sheaths 8 are variations of the means for heating the catalytic zone, said heating means being supplied via a means 15 for supplying oxidizing gas mixture and a means 17 for supplying gaseous fuel.

In a first embodiment illustrated in FIG. 2, the means for heating the catalytic zone 10 are constituted by the following co-axial parts:

a tube 11 for supplying an oxidizing gas mixture which is open at both its ends, one open end being fixed to the tube plate 20 and opening into the oxidizing gas mixture collection space 22, and the other open end being immersed in the sheath 8 to the level of the upper end of the catalytic zone 10;

a fuel distribution means constituted by a tube termed a fuel tube 12, connected at one of its ends to the means for supplying fuel 17 and located inside a tube 11 for supplying an oxidizing gas mixture and substantially of the same dimensions. The lower end of the tube 11 for supplying an oxidizing gas mixture and the lower end of the fuel tube 12 open onto a combustion zone 13, i.e. onto a zone where the combustion reaction occurs. The combustion zone 13 is located in the sheath 8 at the upper end of the catalytic zone 10;

a tube 9 for re-circulating the gaseous effluent from combustion, open at both its ends, and located in the sheath 8 downstream of the combustion zone 13.

Figure 3:
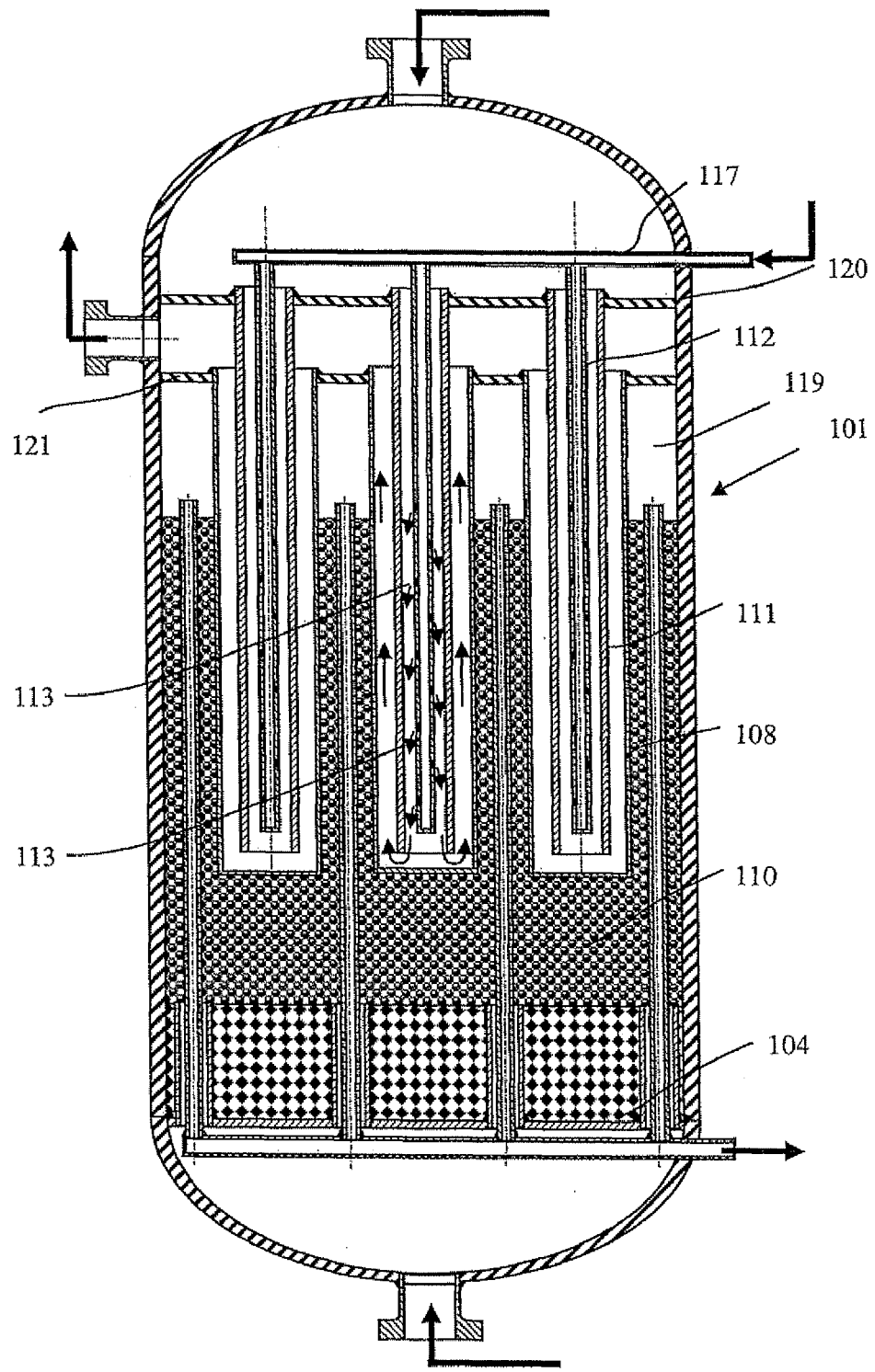
FIG. 3 shows a longitudinal sectional view of the exchanger-reactor of the invention in a variation in which fuel injection is distributed over the whole height of the sheaths.

FIG. 3 illustrates another variation of the heating means in which the tubes 111 for supplying oxidizing gas mixture, containing the fuel tubes 112 of the same dimensions and closed at their lower end, extend to the bottom of the sheaths 108.

The fuel tubes 112 have a sealed wall in their upper portion which is not immersed in the catalytic zone 110, and a porous wall in their lower portion which is immersed in the catalytic zone 10. The porosity is obtained either by dint of holes pierced in the wall of the fuel tubes 112 or by directly using a sintered type, metal foam type or ceramic foam type porous material to produce the tubes. The perforations produced in the wall of the fuel tubes 112 define a plurality of combustion zones 113 distributed along the wall of the fuel tubes 112 immersed in the catalytic zone 110.

The multiplicity of the combustion zones produces better local dilution and as a result, a lower combustion temperature.

Figure 4:
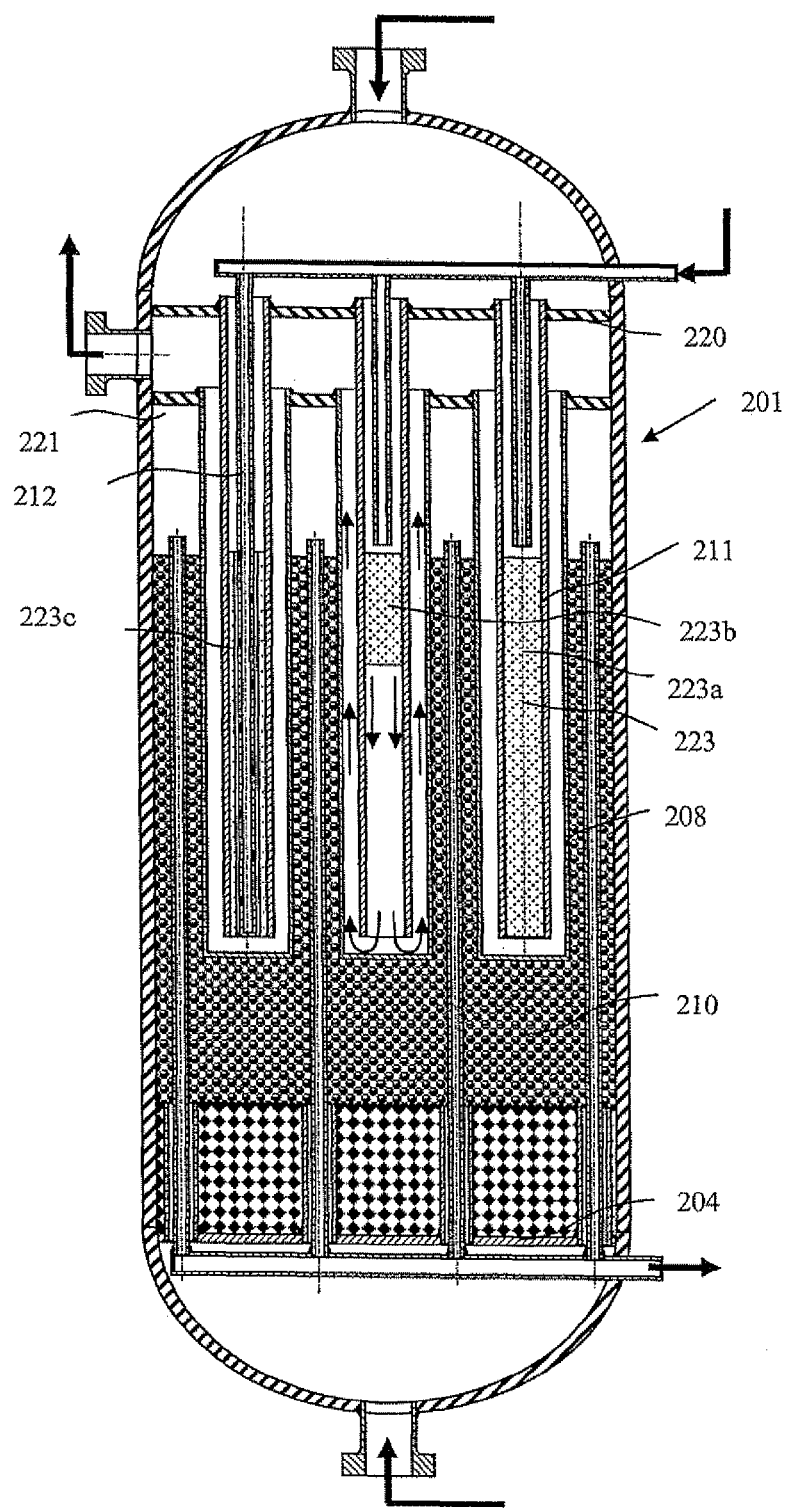
FIG. 4 shows a longitudinal sectional view of the exchanger-reactor of the invention in a variation in which combustion in the sheaths is carried out on an oxidation catalyst.

FIG. 4 shows a variation of the heating means which is identical to the preceding variation, except that catalytic combustion is carried out in these heating means.

In a particular embodiment illustrated at 223c) in FIG. 4, flameless catalytic combustion is produced by disposing an oxidation catalyst inside and over the entire height of the tubes 211 for supplying oxidizing gas mixture immersed in the catalytic zone 210.

In accordance with the particular embodiment shown at 223b), the tubes 211 for supplying oxidizing gas mixture extend to the bottom of the sheath 208 and contain the fuel tube 212 which is shorter than in the variation illustrated at 223c) and wherein its open lower end opens at the upper end of the bed of oxidation catalyst 223. In this variation, the bed of oxidation catalyst is placed inside the tube 211 for supplying an oxidizing gas mixture at the upper end of the catalytic zone 210 and it occupies the entire cross section.

The particular embodiment illustrated at 223a) is identical to the embodiment shown at 223b) except that the bed of oxidation catalyst 223 is distributed over the whole of the immersed height of the tube 211 for supplying an oxidizing gas mixture, and occupies the whole cross section thereof.

FIG. 5 shows the injection of a cooling fluid into the upper portion of the exchanger-reactor 301. The aim of said injection is essentially to cool the tube plate 321 blocking the chamber 319 for collecting effluent from the catalytic zone, in the case where heat exchange between the gaseous effluent from combustion and the oxidizing gas mixture along the wall of the combustion tube 311 is insufficient to reduce the temperature of the gaseous effluent derived from combustion to a temperature which can be withstood by the tube plate 321.

Figure 5A:
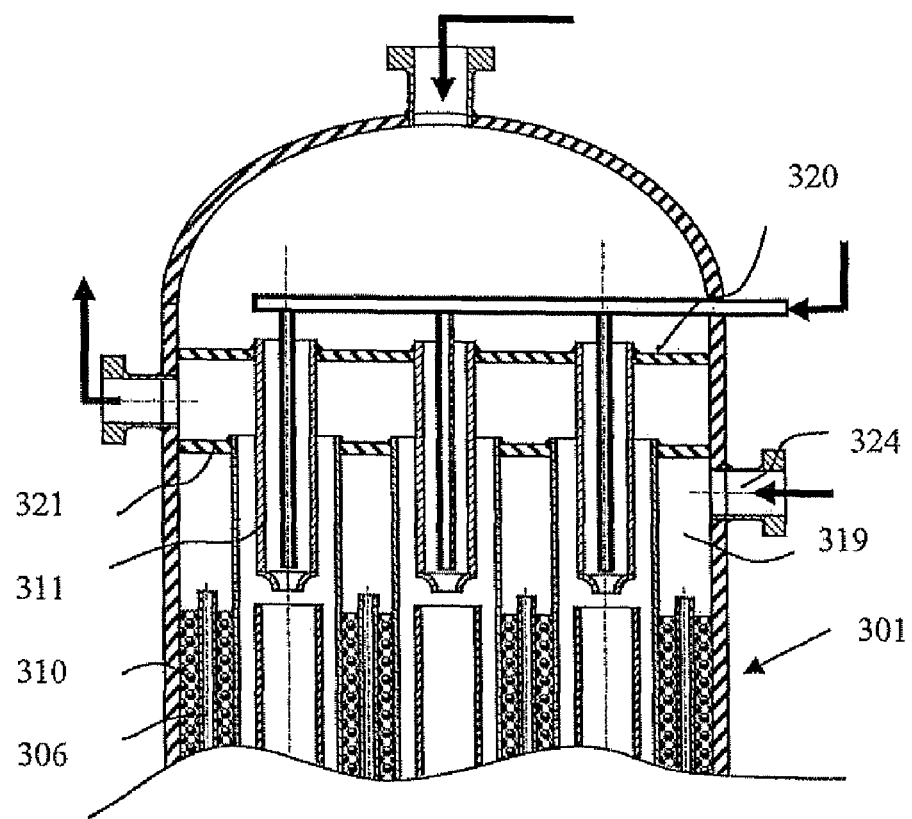
FIGS. 5a and 5b show a longitudinal sectional view of the upper portion of the exchanger-reactor in variations in which a cooling system is employed.

FIG. 5a shows a variation in which direct injecting cooling fluid is carried out beneath the tube plate 321. The cooling fluid is mixed with effluent from the catalytic zone 310 and is evacuated from the vessel of the exchanger-reactor via tubes constituting the means 306 for collecting effluent from the catalytic zone.

Figure 5B:
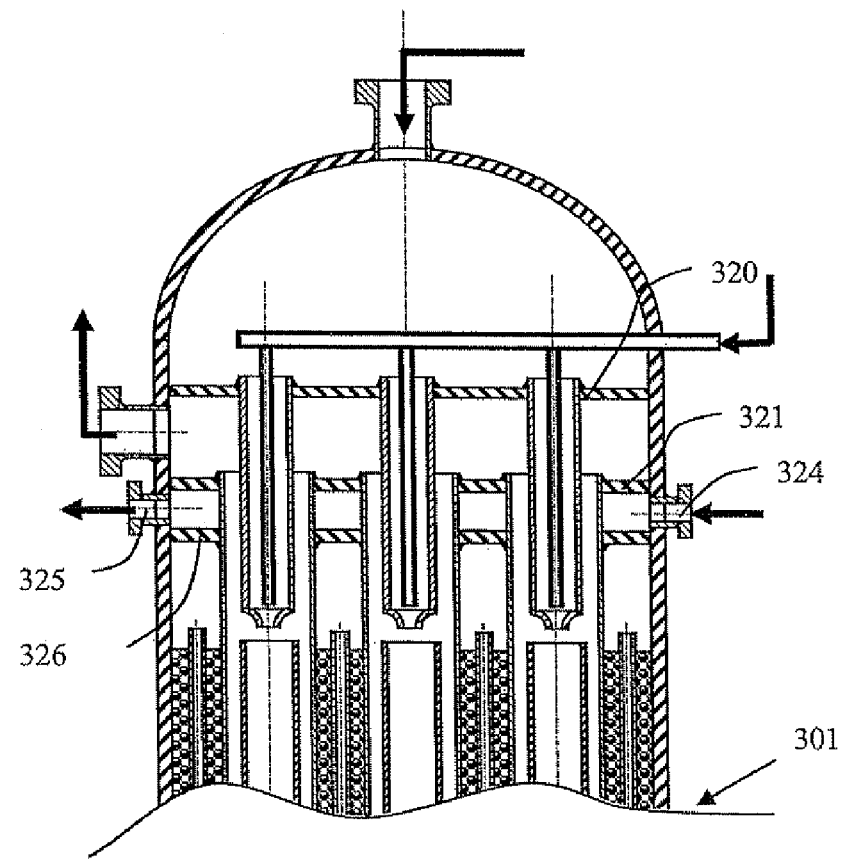

FIG. 5b shows another variation in which the perforated tube plate 321 is constituted by a double wall 321, 326 through which the sheaths 308 pass. The lower double walled perforated tube plate 321 and 326 form a closed space comprising a means for injecting cooling fluid 324, and a means 325 for evacuating the same fluid after heat exchange.

To protect the upper tube plate 21 from the high temperatures in the collection chamber 19, it is also possible to cover the surface of said upper tube plate 21 in contact with the effluent from the catalytic zone with a heat screen 27 shown in FIG. 1. The heat screen is produced from an insulating material such as refractory concrete or ceramic, for example. This heat screen 27 is only shown in FIG. 1 but may be present in all of the Figures.

Although distributing the fuel is ensured by a single means for supplying fuel 17, which is common to all of the fuel tubes 12 of FIGS. 2 to 5, the invention is not limited to this particular mode of supply; it is also possible to supply each fuel tube 12 with an independent supply means.

This particular embodiment, not shown in the Figures, allows the combustion in each heating means to be controlled independently.

Although it is orientated vertically, in the variations described above, the invention is not limited to a particular mode of orientation.

The vessel of the exchanger-reactor is cylindrical in shape in the variations described above, but the invention is not limited to this shape for the reactor. The vessel of the exchanger-reactor may have a different cross-section.

The tube plates 4, 20 and 21 are sealingly fixed to the inner walls of the chamber.

They are preferably welded to the chamber or bolted on using a seal.

The perforated lower tube plate 4 may be sealingly fixed to the inner walls of the chamber and is preferably welded to the chamber or bolted on with a seal.

The feed tubes 5 may be welded to the perforated lower tube plate 4 in the extension of the perforations.

The perforated lower tube plate 4 may also be fastened to a support ring fixed to the inner wall of the chamber.

The feed tubes 5 may also be fastened to the perforated lower tube plate 4.

The perforated lower tube plate 4 may also simply be held in position by the inert beads filling the collection space 23 and the fixed bed catalytic zone 10 charged from above.

The technology of the exchanger-reactor described above is adapted to any type of endothermic reaction. In the context of the invention it is particularly suited to the steam reforming reaction.

Application of Device to the Steam Reforming Reaction

In the case in which the exchanger-reactor is used to carry out a steam reforming reaction, the hydrocarbon feed comprises a mixture of light hydrocarbons such as natural gas, refinery gas, LPG, light naphthas and biogases, for example, derived from the fermentation of waste or biomass, taken alone or as a mixture, with steam, preferably a mixture of methane and steam in the case in which the endothermic reaction is the steam methane reforming reaction.

In this case, the fixed bed catalytic zone which at least partially fills the vessel of the exchanger-reactor is divided into three catalytic zones disposed one above the other:
  a lower inert zone in contact with the tube plate, composed of a bed of inert particles;
  a median pre-reforming catalytic zone composed of a catalyst which may be identical to or different from that used in the active steam reforming catalytic zone;
  an upper steam reforming catalytic zone which is composed of a conventional steam reforming catalyst.

In the case in which the upper steam reforming catalytic zone and the median pre-reforming catalytic zone are composed of the same catalyst, it is a conventional steam reforming catalyst comprising 8% to 25% by weight of a group VIII element, preferably nickel, and 1% to 4% by weight of potassium supported on alumina.

In the case in which the upper steam reforming catalytic zone and the median pre-reforming catalytic zone are composed of different catalysts, the catalyst used in the upper steam reforming catalytic zone is that described above and the catalyst used in the median pre-reforming catalytic zone is a specific pre-reforming catalyst comprising 1% to 20% by weight of a group VIII element, preferably nickel, 0.4% to 5% by weight of potassium supported on alumina or calcium aluminate.

The inert particles constituting the inert catalytic zone are generally constituted by alumina in the form of beads.

In the upper portion of the exchanger-reactor, the mixture of hydrocarbon feed and steam penetrates into the vessel via the supply means 3, traverses the lower tube plate 4 and penetrates into the lower inert zone, passing into the feed tubes 5 traversing said zone. The mixture is heated up by moving in the feed tubes disposed around the means 6 for collecting the synthesis gas produced, by exchange of heat with the synthesis gas moving inside the collection means.

This lower inert zone, which is not heated by the heating means, constitutes a first heat exchange zone. It allows convective heat exchange between the stream of hydrocarbon feed and the stream of synthesis gas produced moving as a counter-current.

The pre-heated mixture then penetrates into the median pre-reforming catalytic zone defined by the upper end of the inert zone and the closed end of the sheath. This pre-reforming zone is a zone for pre treatment of the hydrocarbon feed before its passage into the reaction zone, to at least partially convert the hydrocarbon feed into synthesis gas. The energy necessary for this reaction is supplied by the feed, which has itself been pre-heated at the lower inert zone in the feed tubes, but also by heat exchange with the synthesis gas moving inside the synthesis gas tubes, at the median pre-reforming catalytic zone.

This pre-reforming zone which is not heated by the heating means constitutes a second heat exchange zone. This second heat exchange zone allows the stream of hydrocarbon feed moving in the median catalytic pre-reforming zone to be pre-heated and supplies the energy necessary for the pre-reforming reaction while cooling the stream of synthesis gas moving as a counter-current in the means for collecting synthesis gas traversing the catalytic zone.

Carrying out a pre-reforming reaction is of distinct interest in the context of the invention:
  the heat contained in the synthesis gas produced is used to best advantage as heat exchange not only pre-heats the feed but also converts it. This limits the charging of the principal reformer and provides a higher temperature of attack of the principal reformer for an equivalent coke formation risk;
  pre-reforming can also convert the heaviest components of the feed, which preserves the catalyst of the principal reformer and gives more flexibility to the facility as regards the nature of the feed to be treated.

The effluent produced in the median pre-reforming zone then penetrates into the upper catalytic zone constituted by a steam reforming catalyst and rises along this zone, producing synthesis gas. The energy necessary for this reaction is principally supplied by radiative and convective heat exchange with the heating means, but also by convective heat exchange with the synthesis gas moving inside the means for collecting synthesis gas traversing the catalytic zone.

This steam reforming zone thus constitutes a third heat exchange zone located at the level of the upper catalytic zone, i.e. in the zone where the steam reforming reaction takes place which is defined by the space located between the lower closed end of the sheath and the upper end of the catalytic zone. This third zone allows both radiative and convective heat exchange.

The synthesis gas produced in the upper catalytic steam reforming zone leaves the catalytic zone and is collected in the collection chamber 19 located above the catalytic zone, said collection chamber being blocked by the upper tube plate 21.

The means 6 for collecting the synthesis gas produced are distributed in the catalytic zone and are interposed between the heating means so that heat exchanges between the feed and the synthesis gas produced are homogeneous.

The presence of means 6 for collecting the synthesis gas produced passing right through the catalytic zone thus allows convective heat exchanges over the entire height of the catalytic zone between the feed and the synthesis gas produced by the counter-current motion of these two streams: on leaving the upper catalytic steam reforming zone, the synthesis gas produced penetrates into the means 6 for collecting the synthesis gas produced passing right through the catalytic zone and drops to the lower portion of the exchanger-reactor, cooling over the entire length of the catalytic zone, by heat exchange with the effluent moving in the upper catalytic zone then in the median pre-reforming catalytic zone, then with the feed moving in the feed tubes in the lower inert zone. The synthesis gas produced is then evacuated from the exchanger-reactor by the evacuation means 18.

In the upper portion of the exchanger-reactor, the oxidizing gas mixture penetrates into the vessel via the supply means 15, traverses the tube plate 20 and penetrates into the heating means via the means 11 for supplying the oxidizing gas mixture.

The gaseous fuel also penetrates into the vessel via the corresponding supply means 17, then into the fuel tubes 12 located inside the tubes 11 for supplying oxidizing gas mixture.

The oxidizing gas mixture is a gas containing 0.1% to 21% of oxygen, preferably comprising air, a mixture of oxygen and carbon dioxide or, highly preferably, fumes from a gas turbine for the generation of electricity. In this case, the oxidizing gas mixture is constituted by oxidizing fumes derived from a turbine.

The gaseous fuel comprises a hydrocarbon in the gaseous form of the natural gas or refinery gas type, or in the liquid form, of the gasoline, gas oil or heavy fuel type, pre-vaporized before it enters the reactor and preferably, hydrogen produced by the reactor itself is used, purified following a separation treatment.

In a first variation of the heating means shown in FIG. 1, at the outlet from the fuel tubes 12, the gaseous fuel mixes with the oxidizing gas mixture at the combustion zone and reacts by a combustion reaction which produces high temperature fumes at the upper end of the catalytic zone.

These fumes penetrate into the re-circulation tubes, are guided to the bottom of the sheaths 8 and rise in the annular space formed between the re-circulation tubes 9 and the sheaths 8.

Over the entire height of the re-circulation tube 9, the fumes which drop in the re-circulation tube heat, by heat exchange, the fumes which rise in the annular space formed between the re-circulation tube and the inner wall of the sheath. These fumes heat the reaction effluent in the upper catalytic zone by heat exchange through the wall of the sheaths 8.

These counter-current heat exchanges are intended to reduce the thermal gradient over the height of the sheaths as much as possible. In this manner, the heat transferred by the fumes deriving from combustion to the catalytic zone is relatively homogeneous over the entire height of the sheaths immersed in the catalytic zone.

In the upper portion of the re-circulation tubes 9, a portion of the fumes which rise in the annular space formed between the re-circulation tube and the sheath is entrained by the fumes produced in the combustion zone 13 and re-circulate again in the re-circulation tubes. This configuration can dilute and locally agitate the combustion reagents and thus reduce the temperature of the flame produced by combustion, which preserves the materials from too high a temperature and reduces the formation of oxides of nitrogen which are prejudicial to the environment.

The hot fumes from combustion which do not re-circulate in the re-circulation tubes rise in the annular space formed between the tubes 11 for supplying oxidizing gas mixture and the sheaths 8 and cool by heat exchange with the oxidizing gas mixture which is itself reheated as it drops in the tubes 11 for supplying the oxidizing gas mixture.

This zone, located between the end of the catalytic zone and the tube plate 20, constitutes a fourth heat exchange zone. This fourth zone allows convective heat exchange between the stream of fumes from combustion before their evacuation from the vessel and the flow of oxidizing gas mixture which penetrates into the heating means.

This fourth heat exchange zone is very important as it can reduce the temperature of the fumes from combustion sufficiently to be able to use conventional welded tube plate type technology, i.e. using ordinary metal alloys to produce the plates. After having traversed said tube plate, the fumes deriving from combustion are evacuated from the vessel of the exchanger-reactor via the evacuation means 14.

In FIG. 2, the heating means distribute the injecting the fuel into the flow of oxidizing gas mixture and can thus produce a more extensive combustion zone 113. The gaseous fuel moves in the fuel tubes 112 to their porous portion where they pass through the tube wall to burn in contact with the oxidizing gas mixture moving in the tube 111 for supplying the oxidizing gas mixture. The fumes from combustion then move to the bottom of the sheaths 108 and rise in the annular space formed between the tubes 111 for supplying the oxidizing gas mixture and the sheaths 108, exchanging heat thereby with the reaction zone and with the fumes from the combustion contained in the tubes for supplying oxidizing gas mixture.

In this manner, combustion is distributed over the entire porous height of the fuel tube as a function of the selected porosity. Thus, by modulating the porosity, it is possible to distribute the heat either homogeneously over the height of the tube or inhomogeneously if a thermal profile is to be imposed. As an example, it is possible to accentuate the porosity in the lower portion of the tube, which would increase the flow rate of the fuel in this zone and as a result increase the combustion temperature. In this case, the temperature of the combustion fumes is higher in the lower portion of the sheath than in the upper portion.

In FIG. 3, the heating means employ flameless combustion inside the tubes 211 for supplying the oxidizing gas mixture, by means of an oxidation catalyst 223 distributed in said supply tubes. The oxidizing gas mixture penetrates into the exchange-reactor, traverses the tube plate 220 and moves in the tubes 211 for supplying oxidizing gas mixture up to the oxidation catalyst 223. The oxidizing gas mixture and the fuel mix close to the oxidation catalyst and react thereon by flameless combustion to produce hot fumes. These combustion fumes leave the tubes for supplying the oxidizing gas mixture from the lower portion and rise in the sheaths 208, supplying energy to the catalytic zone by heat exchange before evacuating them from the vessel.

Flameless combustion using an oxidation catalyst has the advantage of avoiding the presence of hot spots which could damage the materials and of improving combustion, reducing the presence of unburned components in the fumes.

The oxidation catalyst comprises 1% to 10% of a noble element from group VIII of the periodic table of the elements, preferably palladium and/or platinum on an alumina or zirconia type support. The oxidation catalyst is used in the form of a surface deposit or wash coat deposited on a monolith or a foam produced from a high temperature refractory alloy type metallic material or a ceramic material, such as cordierite.

In a particular embodiment shown in FIGS. 4a and 4b, it is possible to inject a cooling fluid directly beneath the upper tube plate 321, into the chamber for collecting effluent from the catalytic zone (see FIG. 4a) to cool said plate, and to allow the use of a conventional welded tube plate, i.e. using ordinary metallic alloys to produce the plates. The cooling fluid mixes with the synthesis gas produced and is evacuated with it from the reactor vessel via the means for collecting synthesis gas communicating with the evacuation means.

It is also possible to inject a cooling fluid into the space located between the double wall of the upper tube plate 321/326, said plate being perforated and allowing passage of the sheaths as shown in FIG. 4b.

Said perforated plate, constituted as a double wall 321, 326, is sealed and fixed to the exchanger-reactor vessel. The sheaths pass through the plate via a sealed mount produced by welding or mechanical assembly, for example. The mechanical assembly may be a seal compressed by a packing box or a metal bellows, the principle of said connection being to allow, when hot, displacement of the sheaths through the perforated plate while retaining a seal.

Injecting the cooling fluid can cool said upper tube plate constituted as a double wall 321, 326 and the sheaths by heat exchange, the cooling fluid then being evacuated from the vessel of the exchanger-reactor by the evacuation means also located between the double wall of the upper tube plate.

The cooling fluid may be of any nature, in the vapour form, and preferably as steam. The feed may also be used as a cooling fluid; it will thus be pre-heated before being introduced into the exchanger-reactor. The oxidizing gas mixture may also be used as well as any other heat exchanging fluid.

Injecting the cooling fluid at a single point of the exchanger-reactor is not exclusive. Introduction may be effected via multiple injection points positioned on the circumference of the vessel of the exchanger-reactor to cover the entire surface of the tube plate.

In another implementation of the exchanger-reactor, the stoichiometry of the mixture of fuel/oxidizing gas mixture may be modified to carry out only partial oxidation of the fuel and thus to produce synthesis gas. As an example, if the fuel is methane, the oxygen insufficiency results in the following reaction:

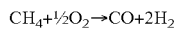

$$CH_4 + \tfrac{1}{2}O_2 \rightarrow CO + 2H_2$$

This reaction, which is highly exothermic, occurs at a high temperature in the range 1200° C. to 1500° C.; the heat produced may be used for the steam reforming reaction, as in the preceding basic case.

This implementation may increase the yield of the exchanger-reactor since in this case, the combustion fumes are composed of synthesis gas.

In a variation of this other mode of use of the exchanger-reactor, a partial oxidation catalyst may be used by modifying the stoichiometry of the mixture of fuel/oxidizing gas mixture to produce synthesis gas by catalytic partial oxidation. This reaction is highly exothermic and the heat produced may be used for the steam reforming reaction, as in the preceding basic case.

In this case, the oxidation catalyst comprises 5% to 30% of a noble element from group VIII of the periodic table of the elements, preferably palladium, platinum or, more preferably, rhodium, deposited on a ceramic alumina, cordierite or zirconia type support, preferably a support of porous alpha alumina.

Operating Conditions

The steam reforming reaction advantageously operates at a high temperature which varies between the catalytic zone inlet and outlet:

at the inlet to the catalytic zone, the temperature is in the range 500° C. to 750° C.;

at the outlet from the catalytic zone, the temperature is in the range 750° C. to 950° C., preferably in the range 850° C. to 900° C.

The steam reforming reaction advantageously operates at a pressure in the range 0.5 to 5 MPa, preferably in the range 1 to 4 MPa and more preferably in the range 2 to 2.5 MPa.

At the inlet to the exchanger-reactor, the hydrocarbon feed is composed of a mixture of hydrocarbon with steam in proportions such that the steam/carbon molar ratio is advantageously in the range 2 to 5 and preferably in the range 2.3 to 2.7.

At the inlet to the exchanger-reactor, the temperature of the hydrocarbon feed is advantageously in the range 350° C. to 750° C. and is preferably in the range 550° C. to 650° C., and the hydrocarbon feed penetrates into the vessel of the exchanger-reactor at a pressure which is substantially identical to the above reaction pressure.

After the steam reforming reaction, the synthesis gas produced leaves the catalytic zone and penetrates into the synthesis gas collection means at a temperature which is advantageously in the range 750° C. to 950° C, preferably in the range 850° C. to 900° C.

At the outlet from the exchanger-reactor vessel, the temperature of the synthesis gas produced is advantageously in the range 300° C. to 500 °C, preferably in the range 350° C. to 450 °C, and the synthesis gas produced leaves the exchanger-reactor vessel at a pressure substantially identical to the above reaction pressure.

At the inlet to the exchanger-reactor, the temperature of the oxidizing gas mixture is advantageously in the range 300° C. to 800° C. and is preferably in the range 650° C. to 750° C. in the case in which the oxidizing gas mixture is constituted by fumes removed from turbine outlets, and preferably in the range 350° C. to 450° C. in the case in which the oxidizing gas mixture is constituted by fumes removed from compressor outlets.

The oxidizing gas mixture penetrates into the exchanger-reactor vessel at a pressure which is advantageously in the range 0.05 to 4 MPa and is preferably in the range 0.3 to 0.5 MPa.

Following combustion, the temperature of the gas mixture from combustion is advantageously in the range 900° C. to 1500° C., and more preferably in the range 900° C. to 1000° C.

At the outlet from the exchanger-reactor vessel and after cooling by heat exchange with the oxidizing gas mixture, the temperature of the gas mixture from combustion is reduced to a temperature in the range 700° C. to 900° C. and preferably in the range 700° C. to 750° C.

Advantageously, the fuel is introduced into the vessel of the exchanger-reactor at a temperature which is in the range from ambient temperature to 400° C. and preferably in the range from ambient temperature to 150° C., and at a pressure in the range 0.05 to 4 MPa and preferably in the range 0.3 to 0.5.

Advantageously, the cooling fluid is introduced into the interior of the exchanger-reactor vessel at a temperature in the range 100° C. to 400° C., preferably in the range 250° C. to 350° C.

The invention claimed is:
1. An exchanger-reactor (1) comprising:
a vessel (2);
a distributor suitable for distributing a feed through a fixed bed catalytic zone (10);
a collector (6) suitable for collecting effluent derived from the catalytic zone (10);
a heater suitable for heating the catalytic zone (10);

in which said collector (6) comprises conduits passing through over the entire height of the catalytic zone (10), said conduits being distributed in the catalytic zone and interposed between the heater, and in which the heater is contained in sheaths (8) which are partially immersed in the catalytic zone (10), the sheaths (8) being open at one of their ends and closed at the other, the open end being fixed to an upper tube plate (21) defining the collection chamber (19) which is located above the catalytic zone (10), said heater within a sheath comprising at least one combustion zone (13), an inlet for supplying said combustion zone (13) with an oxidizing gas mixture (15) and with a gaseous fuel (17), and an outlet for evacuating the gaseous effluent deriving from the combustion (14).

2. An exchanger-reactor (1) according to claim 1, in which at least two collectors (6) are distributed in a single fixed bed catalytic zone and are interposed between at least two heaters.

3. An exchanger-reactor (1) according to claim 1, in which the distributor comprises a perforated lower tube plate (4) the perforations of which are extended by tubular elements termed feed tubes (5).

4. An exchanger-reactor (1) according to claim 3, in which the perforated lower tube plate (4) is held in position by a bed of inert beads.

5. An exchanger-reactor (1) according to claim 3, in which the catalytic zone (10) comprises at least one lower inert zone (10c) located on said lower tube plate (4).

6. An exchanger-reactor (1) according to claim 5, in which the thickness of the lower inert zone (10c) substantially corresponds to the length of said feed tubes (5).

7. An exchanger-reactor (1) according to claim 3, in which the conduits of the collector traverse said lower tube plate (4) in an internal space of the feed tubes (5).

8. An exchanger-reactor (1) according to claim 1, in which the distributor comprises truncated horizontal perforated plate (4) and a non-truncated upper perforated plate (26), the perforations allowing passage of the collector conduits (6).

9. An exchanger-reactor (1) according to claim 8, in which the truncated horizontal perforated plate (4) and the non-truncated upper perforated plate (26) are disposed in an inert lower zone (10c) and form baffles.

10. An exchanger-reactor (1) according to claim 1, in which the conduits of the collector are located between a collection chamber (19) located downstream of the catalytic zone (10) and an effluent outlet (18).

11. An exchanger-reactor (1) according to claim 1, in which the conduits of the collector comprise ribs on their outer wall to increase their surface area in contact with the catalytic zone (10).

12. An exchanger-reactor (1) according to claim 1, in which the sheaths (8) comprise ribs on their outer wall to increase their surface area in contact with the catalytic zone (10).

13. An exchanger-reactor (1) according to claim 1, in which the heater comprises the following co-axial parts:
   a tube (11) suitable for supplying an oxidizing gas mixture, opening into a sheath (8) substantially at the upper level of the catalytic zone (10);
   a fuel tube (12) suitable for distributing fuel, connected at one of its ends to the inlet for supplying fuel (17) and located inside said tube (11) and opening substantially at the same level as said tube (11).

14. An exchanger-reactor (1) according to claim 13, in which the combustion zone is located in the sheaths (8) at the upper end of the catalytic zone (10).

15. An exchanger-reactor (1) according to claim 13, in which the heater comprises a tube (9) suitable for re-circulating gaseous effluent deriving from the combustion zone, open at both of its ends, and located in the sheaths (8) downstream of the combustion zone (13).

16. An exchanger-reactor (101) according to claim 1, in which the heater comprises in the sheaths (8) the following co-axial parts:
   a tube (111) suitable for supplying an oxidizing gas mixture opening into the sheath (108) substantially at the bottom of said sheath;
   a fuel tube (112) suitable for distributing fuel, connected at one of its ends to the inlet (117) for supplying fuel, located inside said tube (111) and extending substantially to the bottom of the sheath (108), said fuel tube (112) comprising at least one porous wall portion.

17. An exchanger-reactor (101) according to claim 16, in which the at least one porous wall portion of the fuel tube (112) defines a plurality of combustion zones (113) distributed along the wall of the fuel tube (112) in an immersed portion of at least one sheath (8) in the catalytic zone (110).

18. An exchanger-reactor (201) according to claim 16, in which the tube (211) suitable for supplying the oxidizing gas mixture is filled to its full height and up to the upper end of the catalytic zone with an oxidation catalyst (223).

19. An exchanger-reactor (201) according to claim 1, in which the heater comprises in the sheaths (8):
   a tube (211) suitable for supplying the oxidizing gas mixture opening into a sheath (208) substantially at the bottom of said sheath; and
   an oxidation catalyst (223) inside and over at least a portion of the height of said tube (211) suitable for supplying the oxidizing gas mixture at a right angle to the catalytic zone (210) and disposed downstream of a fuel distribution tube (212).

20. An exchanger-reactor (301) according to claim 1, in which a cooling fluid is injected into a chamber (319) suitable for collecting effluent deriving from the catalytic zone (310).

21. An exchanger-reactor (301) according to claim 1, in which the upper tube plate (21) is perforated and forms an upper perforated tube plate (321), which is constituted by a double wall (321), (326) suitable for allowing a cooling fluid to move in the internal space.

22. An exchanger-reactor (301) according to claim 1, in which the combustion zone (13) is located in a portion of at least one sheath (8) which is immersed in the catalytic zone (10).

23. A method for performing a steam reforming reaction, comprising performing said steam reforming reaction in the exchanger-reactor of claim 1.

* * * * *